United States Patent [19]

Higgen

[11] Patent Number: 4,572,300
[45] Date of Patent: Feb. 25, 1986

[54] VIBRATING HARROW

[75] Inventor: Reinhard Higgen, Eichenweg, Fed. Rep. of Germany

[73] Assignee: Amazonen Werke H. Dreyer GmbH & Co KG, Hasbergen-Gaste, Fed. Rep. of Germany

[21] Appl. No.: 669,814

[22] Filed: Nov. 8, 1984

[30] Foreign Application Priority Data

Nov. 11, 1983 [DE] Fed. Rep. of Germany ....... 3340821

[51] Int. Cl.⁴ .............................................. A01B 19/06
[52] U.S. Cl. ...................................... 172/54.5; 172/96
[58] Field of Search ................ 172/117, 118, 96, 54.5, 172/91, 40

[56] References Cited

U.S. PATENT DOCUMENTS

| 3,791,453 | 2/1974 | Oosterling | 172/54.5 |
| 4,390,070 | 6/1983 | Barlage | 172/54.5 |

FOREIGN PATENT DOCUMENTS

| 121834 | 12/1970 | United Kingdom | 172/54.5 |
| 123970 | 7/1971 | United Kingdom | 172/40 |

Primary Examiner—Richard J. Johnson
Attorney, Agent, or Firm—Sprung, Horn, Kramer & Woods

[57] ABSTRACT

A vibrating harrow with a supporting frame consisting of at least two beams that are positioned one behind another, extend across the direction of travel, and are equipped with soil-cultivation tines. The beams are mounted on the supporting frame by means of rockers and are moved back and forth across the direction of travel during operation through the intermediary of a drive mechanism by the power source of a tractor or cultivator. In order to provide a very simple and effective suspension for the cultivating tines parallel and at an angle to the direction of travel when obstacles are encountered in the soil, the beams are longitudinal beams with a U-shaped cross-section, the open side of each longitudinal beam faces away from the direction of travel, the rockers are mounted on the upper flank of the beams, the tines are mounted on the lower flank of the beams, and the beams are open at the rear over approximately their total length.

15 Claims, 4 Drawing Figures

VIBRATING HARROW

BACKGROUND OF THE INVENTION

The present invention relates to a vibrating harrow with a supporting frame consisting of at least two beams that are positioned one behind another, extend across the direction of travel, and are equipped with soil-cultivation tines. The beams are mounted on the supporting frame by means of rockers and are moved back and forth across the direction of travel during operation through the intermediary of a drive mechanism by the power source of a tractor or cultivator.

A vibrating harrow of this type is known from German Offenlegungsschrift No. 1 964 571. The longitudinal beams in that harrow are made out of a strip of section that is more or less closed in that the open side of the section is closed off by the tine attachment. Thus the beam itself cannot serve as a spring mounting for the tines. Each of the tines is accordingly attached to a suspension in the form of a bent leaf spring so that they can avoid any stones encountered in the soil. Each adjacent pair of tines is also rigidly connected together to decrease their resiliency across the direction of travel and allow satisfactory cultivation of the soil. The drawback of this method or resiliently attaching the tines is its considerable engineering expense.

SUMMARY OF THE INVENTION

The object of the present invention is to provide a very simple and effective suspension for the cultivating tines parallel and at an angle to the direction of travel when obstacles are encountered in the soil.

This object is attained in accordance with the invention in that the beams are longitudinal beams with a U-shaped cross-section, in that the open side of each longitudinal beam faces away from the direction of travel, in that the rockers are mounted on the upper flank of the beams, in that the tines are mounted on the lower flank of the beams, and in that the beams are open at the rear over approximately their total length.

These measures allow the tines, because of the resiliency of the free flanks of the longitudinal beams, to avoid any stones or other obstacles encountered in the soil. This considerably decreases the stress on the tines and lists, an extremely easy mode of avoiding broken tines and bent lists.

In one preferred embodiment of the invention the U-shaped longitudinal beams are open at the rear over their total length. This design is especially simple.

The longitudinal beams can also be made out of spring steel. This results in optimal resiliency.

The longitudinal beams in the embodiment just described can also be hardened. This increases the section modulus of the beam.

In one preferred embodiment stops are distributed along each longitudinal beam between its individual flanks and wherein the stops are separated from each other at least toward one flank by a certain distance A when the flanks are in the normal setting. Preferably, the stops can be adjustable.

The stops can limit the extent to which the free flank of the U-shaped cross-section of the list can bend toward each other. The flanks can accordingly deform only within a specific range of resiliency and will not remain bent.

One embodiment of the invention is characterized in that damping material can be inserted between the free flanks of the lists. This not only limits the extent to which the free flank can bend but also supports it.

Another embodiment of the invention is characterized in that reinforcements can be mounted on the lists near where the rockers are attached. This ensures reliable attachment of the beam to the rockers without overstressing the upper flank.

The free flanks of the beams can differ in length L. This provides the beams with different levels of resiliency. Moreover, the forward beam can be less resilient than the rear beam. This counteracts the heavier stress on the forward beam, which is the first to contact the soil. The tines on the rear beam of course cultivate soil that has already been loosened by the tines on the forward beam.

In one embodiment of the invention, at least one flank of each beam can have incisions, which helps to differentiate the resiliency.

The incisions in one beam can be different from the incisions in the other.

The tines on the forward beam can differ in length from the tines on the rear beam.

The tines on the forward beam can be shorter than the tines on the rear list.

Some preferred embodiments of the invention will now be described with reference to the attached drawings, wherein

DETAILED DESCRIPTION OF THE PREFERRED EMBODIMENTS

Figure 1:
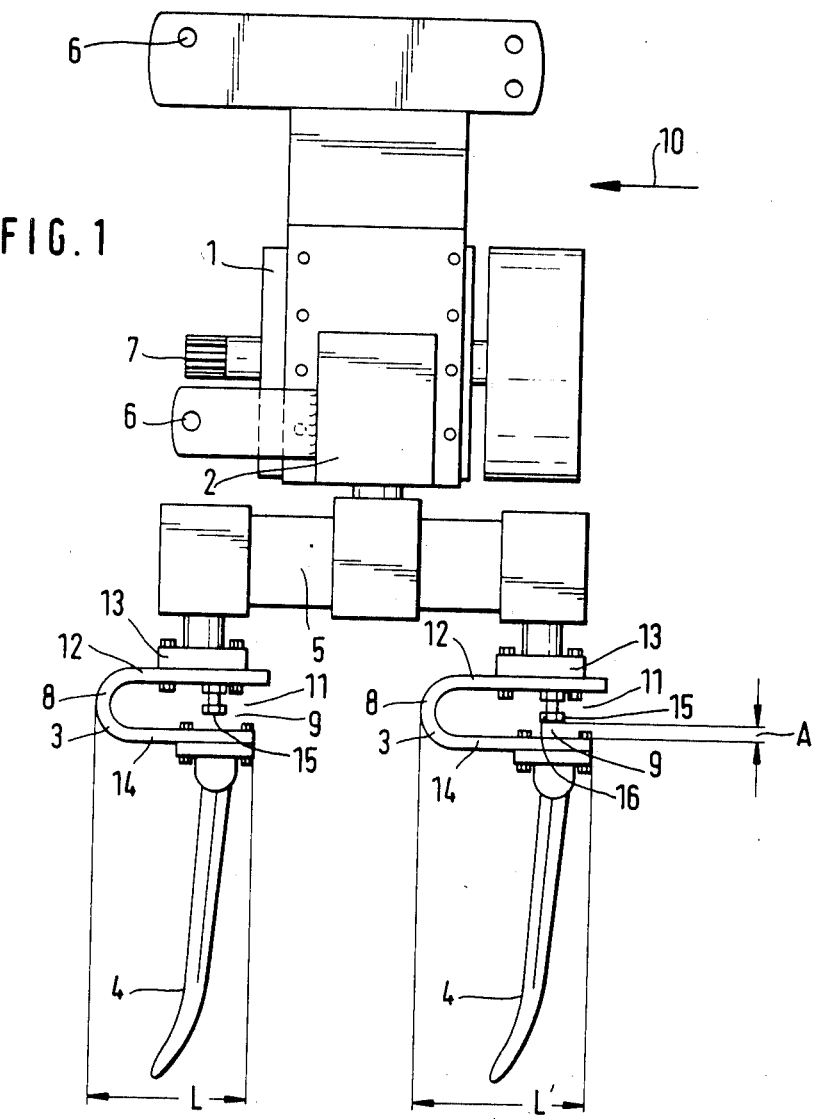
FIG. 1 is a side view of a vibrating harrow in accordance with the invention.

Referring to FIG. 1, the vibrating harrow consists essentially of a drive assembly 1, of a supporting frame 2 screwed tight to the drive assembly, and of two beams 3, one behind the other and provided with tines 4 for cultivating the soil. Beams 3 are mounted on supporting frame 2 by means of rockers 5. The vibrating harrow is coupled to the three-point power lift of a tractor or cultivator through a three-point linkage 6. A following roller or seed drill can be coupled to the vibrating harrow in a way that is known and hence not illustrated.

Beams 3 are driven through a universal shaft connected to the incoming shaft 7 of drive assembly 1 by the take-off shaft of the tractor or cultivator. The continuous rotation of incoming shaft 7 is converted into a back-and-forth rotation by a wobbler in drive assembly 1 and transmitted to rockers 5. The back-and-forth rotation then moves the beams back and forth across the direction 10 in which the harrow is traveling. The back-and-forth motion of the lists crumbles the soil.

Beams 3 are formed as longitudinal beams 8 with a U-shaped cross-section. The open open side 9 of each beam is to the rear with respect to the direction 10 of travel. The mounts 13 for rockers 5 are positioned on the upper flank 12 of the beams and the tines 4 are fastened to the lower flank 14. Each U-shaped longitudinal beam 8 is open at the rear over its total length. Longitudinal beams 8 are made out of spring steel and hardened once the perforations for attaching the rockers and tines have been stamped out.

Positioning tines 4 on U-shaped longitudinal beams 8 allows the beams to yield slightly to the rear when they encounter stones or other obstacles in the soil because the lower flank 14 will bend resiliently. Tines 4 will accordingly not strike with their total weight against any obstacles that are rigidly embedded in the soil. Some of the force will be accepted by longitudinal beams 8 as they deform and the tines will not be damaged.

Stops 16 in the form of adjustable screws 15 are distributed along each longitudinal beam 8 between the opposite flanks 12 and 14. When flanks 12 and 14 are in the normal position in relation to each other, stops 16 are located at a certain distance A from lower flank 14. Thus, lower flank 14 will only be able to deform within a specific range of resiliency and the tines will be provided with a resilient suspension. Stops 16 keep flank 14 from bending permanently. The stops accordingly limit the extent that flanks 12 and 14 can bend toward each other and keep it within a constant range of deformation.

Free flanks 12 and 14 differ in length with the length of flank 12 being greater than L. This results in a different resiliency in each beam. The flanks of the rear beam are longer than those of the forward beam and thus L' is greater than L. The rear beam is accordingly more resilient than the forward list.

Figure 2:
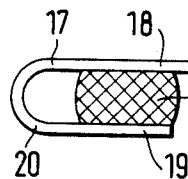
FIG. 2 is a side view of a vibrating harrow in accordance with the invention with inserted damping material.

Between the free flanks 18 and 19 of the U-shaped longitudinal beam 20 in the beam 17 illustrated in FIG. 2 is a buffer 21 made out of a damping material. Buffer 21 can be compressed to a certain extent. The compressed buffer 21 also functions as a stop to limit the extent to which free flanks 18 and 19 can bend toward each other. When a tine on lower flank 19 encounters a stone or other obstacle in the soil, flanks 18 and 19 will bend toward each other to the extent that buffer 21 allows. Once the stone has been passed by, the tine will spring back into its original position along with the lower flank.

Figure 3:
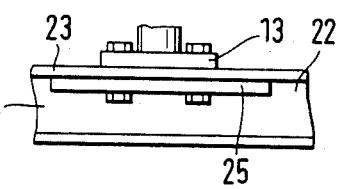
FIG. 3 is a rear view of a vibrating harrow in accordance with the invention with a reinforcement mounted on the beams near where the rockers are attached.

The beam 22 illustrated in FIG. 3 has a reinforcement 25 mounted on its U-shaped longitudinal beam 24 where the mount 13 for the rocker 5 is attached. This distributes the incoming forces over a wide range and ensures reliable attachment.

Figure 4:
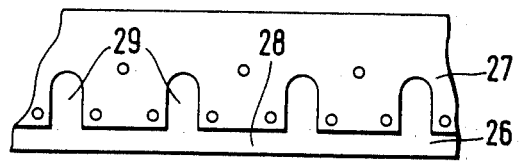
FIG. 4 is a partial view from below of a vibrating harrow in accordance with the invention with incisions in the lower flank of the beam.

Incisions 29 have been stamped into the lower flank 27 of the U-shaped longitudinal beam 28 of the beam 26 illustrated in FIG. 4. This differentiates the resiliency of the beam.

It will be appreciated that the instant specification and claims are set forth by way of illustration and not limitation, and that various modifications and changes may be made without departing from the spirit and scope of the present invention.

What is claimed is:

1. In a vibrating harrow with a supporting frame having at least two beams positioned one behind another and which extend across the direction of travel with soil-cultivation tines depending therefrom and means are mounting the beams on the supporting frame including rockers for moving the beams back and forth across the direction of travel during operation through the intermediary of a drive mechanism by the power source of a tractor or cultivator, the improvement wherein beams are longitudinal beams with a U-shaped cross-section, wherein the open side of each longitudinal beam faces away from the direction of travel, wherein the rockers are mounted on the upper flank of the beams, and the tines are mounted on the lower flank of the beams, and wherein the beams are open at the rear over approximately their total length.

2. The vibrating harrow as in claim 1, wherein the U-shaped longitudinal beams are open at the rear over their total length.

3. The vibrating harrow as in claim 1, wherein the longitudinal beams are made out of spring steel.

4. The vibrating harrow as in claim 3, wherein the longitudinal beams are hardened.

5. The vibrating harrow as in claim 1, further comprising stops distributed along each longitudinal beam between its individual flanks and wherein the stops are separated from each other at least toward one flank by a certain distance when the flanks are in the normal setting.

6. The vibrating harrow as in claim 5, wherein the stops are adjustable.

7. The vibrating harrow as in claim 6, wherein the stops are positioned limit the extent to which the free flank of the U-shaped cross-section of the beam can bend toward each other.

8. The vibrating harrow as in claim 1, further comprising damping material inserted between the free flanks of the beams.

9. The vibrating harrow as in claim 1, further comprising reinforcements mounted on the beams near the attachment to the rockers.

10. The vibrating harrow as in claim 1, wherein the free flanks of the beams differ in length.

11. The vibrating harrow as in claim 1, wherein the forward beam is less resilient than the rear beam.

12. The vibrating harrow as in claim 1, wherein at least one flank of each beam has incisions.

13. The vibrating harrow as in claim 12, wherein the incisions in one beam is different from the incisions in the other.

14. The vibrating harrow as in claim 1, wherein the tines on the forward beam differ in length from the tines on the rear beam.

15. The vibrating harrow as in claim 14, wherein the tines on the forward beam are shorter than the tines on the rear beam.

* * * * *